United States Patent [19]

Ishikura et al.

[11] 4,368,287

[45] Jan. 11, 1983

[54] EMULSIFIER AND COMPOSITIONS COMPRISING SAME

[75] Inventors: Shinichi Ishikura, Kyoto; Keizou Ishii, Hyogo; Kazunori Kanda, Osaka; Ryuzo Mizuguchi, Kyoto, all of Japan

[73] Assignee: Nippon Paint Co., Ltd., Osaka, Japan

[21] Appl. No.: 283,743

[22] Filed: Jul. 15, 1981

[30] Foreign Application Priority Data

Jul. 15, 1980 [JP] Japan .................................. 55-97190
Jul. 15, 1980 [JP] Japan .................................. 55-97191
Jul. 15, 1980 [JP] Japan .................................. 55-97192

[51] Int. Cl.³ ............................................. C08L 67/00
[52] U.S. Cl. .................................... 524/513; 524/814; 526/201; 528/290
[58] Field of Search ............... 260/29.4 UA, 29.6 NR, 260/29.7 NR; 528/240; 524/513, 814; 526/201

[56] References Cited

U.S. PATENT DOCUMENTS 3,673,158 6/1972 Reader et al. ..................... 260/75 N
4,080,315 3/1978 Login ................................. 260/75 N
4,150,216 4/1979 Quack et al. ......................... 528/290

OTHER PUBLICATIONS

"Systematic Analysis of Surface-Active Agents," Rosen & Goldsmith, Wiley-Interscience, N.Y., 1972, p. 524.

*Primary Examiner*—Joseph L. Schofer
*Assistant Examiner*—Bernard Lipman
*Attorney, Agent, or Firm*—Wenderoth, Lind & Ponack

[57] ABSTRACT

An acrylic resin emulsion which comprises an aqueous medium and particles of an acrylic resin emulsified and dispersed therein by the use of the emulsifier comprising as an essential component a polyester comprising in the molecule an amino-sulfonic acid type amphoionic group of the formula:

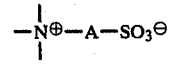

wherein A is a straight or branched $C_1$–$C_6$ alkylene group, a phenylene group or a substituted phenylene group.

7 Claims, No Drawings

EMULSIFIER AND COMPOSITIONS COMPRISING SAME

The present invention relates to an emulsifier and compositions comprising the same. More particularly, it relates to an emulsifier comprising a polyester having an amino-sulfonic acid type amphoionic group in the molecule, an acrylic resin emulsion comprising the emulsifier and a coating composition comprising the acrylic resin emulsion.

In the present specification, the polyester having an amino-sulfonic acid type amphoionic group in the molecule is intended to mean a polyester having in the molecule an amphoionic group of the formula:

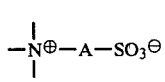  (1)

wherein A is a straight or branched $C_1$-$C_6$ alkylene group, a phenylene group or a substituted phenylene group. More specifically, it may be a polyester comprising units of one or more polycarboxylic acids and units of one or more polyols, characterized in that at least a portion of the polyol units are units of a hydroxyl group-containing amino-sulfonic acid type amphoionic compound of the formula:

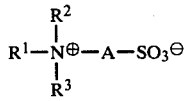  (2)

(wherein $R^1$ is a $C_1$-$C_{20}$ alkyl group bearing at least one hydroxyl group on the alkyl chain and optionally containing at least one —O— and/or at least one —COO— in the alkyl chain, $R^2$ and $R^3$ are each a hydrogen atom, a $C_1$-$C_{20}$ alkyl group, a $C_1$-$C_{20}$ alkyl group bearing at least one hydroxyl group and/or at least one sulfonic group on the alkyl chain or a cyclic group and A is as defined above).

It has now been found that the said polyester has an excellent emulsification activity and a catalytic activity. Particularly, the polyester of oil free type shows a good solubility into various organic solvents and a high miscibility with various solvent type resinous compositions. Thus, it is useful as an emulsifier for emulsification and dispersion of any substance insoluble or hardly soluble in water into an aqueous medium to give a uniform and stable emulsion comprising the substance. It has also been found that when the polyester is used for emulsification of an acrylic resin into an aqueous medium, there is obtained a highly stable emulsion of particles of the acrylic resin which does not produce any coagulation or deposition of the particles even after storage over a long period of time. This is probably due to a strong emulsification activity of the polyester. It has further been found that when the acrylic resin emulsion comprising the said polyester as the emulsifier is used as a coating composition, the amphoionic group in the polyester exerts a catalytic activity so that the curing rate of the coating film formed by the use of the coating composition is accelerated and the crosslinking degree in such coating film is enhanced. Thus, contrary to conventional low molecular emulsifiers which rather tend to deteriorate the physical properties of a coating film comprising them, the said polyester can advantageously increase and strengthen the physical properties of a coating film comprising the same. The present invention is based on the above findings.

The polyester to be used as an emulsifier in the present invention may be produced by a per se conventional procedure for manufacture of polyesters from polycarboxylic acid components and polyol components, provided that the amphoionic compound (2) is used as at least a portion of the polyol component, usually in an amount of from 0.05 to 50% by weight (preferably from 0.1 to 30% by weight) based on the total weight of the monomeric components. Some typical examples of the monomeric components and their amounts for production of the polyester are as follows (% being by weight on the basis of the total weight of the monomeric components):

| Oil free type | |
|---|---|
| (a) Amphoionic compound(s) (2) | 0.005 to 50% (preferably 0.5 to 30%) |
| (b) Polycarboxylic acid(s) | 2 to 90% |
| (c) Polyol(s) | 0 to 90% |
| (d) Oxirane compounds(s) | 0 to 90% |
| Alkyd type | |
| (a) Amphoionic compound(s) (2) | 0.05 to 30% (preferably 0.1 to 20%) |
| (b) Polycarboxylic acid(s) | 2 to 90% |
| (c) Polyol(s) | 2 to 90% |
| (d) Fatty acid(s) and/or oil(s) | 0 to 80% |

Any of the above monomeric components may be used in a free form or in the form of its reactive derivative.

Examples of the amphoionic compound(s) (2) include N-(2-hydroxyethyl)aminomethanesulfonic acid and its N-alkyl and N,N-dialkyl derivatives (e.g. N-methyl-N-(2-hydroxyethyl)aminomethanesulfonic acid, N-ethyl-N-(2-hydroxyethyl)aminomethanesulfonic acid, N-isopropyl-N-(2-hydroxyethyl)aminomethanesulfonic acid, N-(2-ethylhexyl)-N-(2-hydroxyethyl)aminomethanesulfonic acid, N-decyl-N-(2-hydroxyethyl)aminomethanesulfonic acid, N-stearyl-N-(2-hydroxyethyl)aminomethanesulfonic acid, N,N-dimethyl-N-(2-hydroxyethyl)ammoniomethanesulfonic acid betaine, N,N-diethyl-N-(2-hydroxyethyl)ammoniomethanesulfonic acid betaine, N-methyl-N-dodecyl-N-(2-hydroxyethyl)ammoniomethanesulfonic acid betaine), N-(2-hydroxy-1-methylethyl)aminomethanesulfonic acid and its N-alkyl and N,N-dialkyl derivatives, N-(2-hydroxypropyl)aminomethanesulfonic acid and its N-alkyl and N,N-dialkyl derivatives, N-(3-hydroxypropyl)aminomethanesulfonic acid and its N-alkyl and N,N-dialkyl derivatives, N-(2-propyl-2-hydroxyethyl)aminomethanesulfonic acid and its N-alkyl and N,N-dialkyl derivatives, N-(2-methyl-2-ethyl-2-hydroxyethyl)aminomethanesulfonic acid and its N-alkyl and N,N-dialkyl derivatives, N-(1,2-dimethyl-2-hydroxyethyl)aminomethanesulfonic acid and its N-alkyl and N,N-dialkyl derivatives, N-(1,1,2,2-tetramethyl-2-hydroxyethyl)aminomethanesulfonic acid and its N-alkyl and N,N-dialkyl derivatives, N-(1-methyl-5,5-dimethyl-5-hydroxypentyl)aminomethanesulfonic acid and its N-alkyl and N,N-dialkyl derivatives, N-(1,2-diisopropyl-2-hydroxyethyl)aminomethanesulfonic acid and its N-alkyl and N,N-dialkyl derivatives, N-(2,3-dihydroxypropyl)aminomethanesulfonic acid and its N-alkyl and N,N-dialkyl derivatives, N-(1-hydroxymethyl-2- hydroxyethyl)aminomethanesulfonic acid and its N-alkyl and N,N-dialkyl derivatives, N-(1-hydroxymethyl-2-methyl-2-hydroxyethyl)aminomethanesulfonic acid and its N-alkyl and N,N-dialkyl derivatives, N-(1-hydroxymethyl-3-hydroxypropyl)aminomethanesulfonic acid and its N-alkyl and N,N-dialkyl derivatives, N-[1-(γ-hydroxypropyl)-2-hydroxyethyl]aminomethanesulfonic acid and its N-alkyl and N,N-dialkyl derivatives, N-[1,1-bis(hydroxymethyl)-2-hydroxyethyl]aminomethanesulfonic acid and its N-alkyl and N,N-dialkyl derivatives, N-[2,2-bis-(hydroxymethyl)-3-hydroxypropyl]aminomethanesulfonic acid and its N-alkyl and N,N-dialkyl derivatives, N,N-bis(2-hydroxyethyl)aminomethanesulfonic acid and its N-alkyl derivatives (e.g. N-methyl-N,N-bis(2-hydroxyethyl)ammoniomethanesulfonic acid betaine, N-ethyl-N,N-bis(2-hydroxyethyl)ammoniomethanesulfonic acid betaine, N-butyl-N,N-bis(2-hydroxyethyl)ammoniomethanesulfonic acid betaine, N-dodecyl-N,N-bis(2-hydroxyethyl)ammoniomethanesulfonic acid betaine, N-stearyl-N,N-bis(2-hydroxyethyl)ammoniomethanesulfonic acid betaine), N-(2-hydroxyethyl)-N-(2-hydroxypropyl)aminomethanesulfonic acid and its N-alkyl derivatives, N,N-bis(2-hydroxypropyl)aminomethanesulfonic acid and its N-alkyl derivatives, N,N-bis(4-hydroxybutyl)aminomethanesulfonic acid and its N-alkyl derivatives, N-(2-hydroxyethyl)-N-[1,1-bis(hydroxymethyl)-2-hydroxyethyl]aminomethanesulfonic acid and its N-alkyl derivatives, N-(3-hydroxypropyl)-N-[1,1-bis(hydroxymethyl)-2-hydroxyethyl]aminomethanesulfonic acid and its N-alkyl derivatives, N,N-bis(2,3-dihydroxypropyl)-aminomethanesulfonic acid and its N-alkyl derivatives, N,N-bis(1-hydroxymethyl-2-hydroxyethyl)aminomethanesulfonic acid and its N-alkyl derivatives, N,N-bis[1,1-bis(hydroxymethyl)-2-hydroxyethyl]aminomethanesulfonic acid and its N-alkyl derivatives, N,N,N-tris(2-hydroxyethyl)ammoniomethanesulfonic acid betaine, N,N-bis(2-hydroxyethyl)-N-(3-hydroxypropyl)ammoniomethanesulfonic acid betaine, N,N,N-tris(3-hydroxypropyl)ammoniomethanesulfonic acid betaine, N-(2-hydroxyethyl)aminoethanesulfonic acid and its N-alkyl and N,N-dialkyl derivatives, (e.g. N-methyl-N-(2-hydroxyethyl)aminoethanesulfonic acid, N-ethyl-N-(2-hydroxyethyl)aminoethanesulfonic acid, N-isopropyl-N-(2-hydroxyethyl)aminoethanesulfonic acid, N-(2-ethylhexyl)-N-(2-hydroxyethyl)aminoethanesulfonic acid, N-decyl-N-(2-hydroxyethyl)aminoethanesulfonic acid, N-stearyl-N-(2-hydroxyethyl)aminoethanesulfonic acid, N,N-dimethyl-N-(2-hydroxyethyl)ammonioethanesulfonic acid betaine, N,N-diethyl-N-(2-hydroxyethyl)ammonioethanesulfonic acid betaine, N-methyl-N-dodecyl-N-(2-hydroxyethyl)ammonioethanesulfonic acid betaine), N-(2-hydroxy-1-methylethyl)aminoethanesulfonic acid and its N-alkyl and N,N-dialkyl derivatives, N-(2-hydroxypropyl)aminoethanesulfonic acid and its N-alkyl and N,N-dialkyl derivatives, N-(3-hydroxypropyl)aminoethanesulfonic acid and its N-alkyl and N,N-dialkyl derivatives, N-(2-propyl-2-hydroxyethyl)aminoethanesulfonic acid and its N-alkyl and N,N-dialkyl derivatives, N-(2-methyl-2-ethyl-2-hydroxyethyl)aminoethanesulfonic acid and its N-alkyl and N,N-dialkyl derivatives, N-(1,2-dimethyl-2-hydroxyethyl)aminoethanesulfonic acid and its N-alkyl and N,N-dialkyl derivatives, N-(1,1,2,2-tetramethyl-2-hydroxyethyl)aminoethanesulfonic acid and its N-alkyl and N,N-dialkyl derivatives, N-(1-methyl-5,5-dimethyl-5-hydroxypentyl)aminoethanesulfonic acid and its N-alkyl and N,N-dialkyl derivatives, N-(1,2-diisopropyl-2-hydroxyethyl)aminoethanesulfonic acid and its N-alkyl and N,N-dialkyl derivatives, N-(2,3-dihydroxypropyl)aminoethanesulfonic acid and its N-alkyl and N,N-dialkyl derivatives, N-(1-hydroxymethyl-2-hydroxyethyl)aminoethanesulfonic acid and its N-alkyl and N,N-dialkyl derivatives, N-(1-hydroxymethyl-2-methyl-2-hydroxyethyl)aminoethanesulfonic acid and its N-alkyl and N,N-dialkyl derivatives, N-(1-hydroxymethyl-3-hydroxypropyl)aminoethanesulfonic acid and its N-alkyl and N,N-dialkyl derivatives, N-[1-(γ-hydroxypropyl)-2-hydroxyethyl]aminoethanesulfonic acid and its N-alkyl and N,N-dialkyl derivatives, N-[1,1-bis(hydroxymethyl)-2-hydroxyethyl]aminoethanesulfonic acid and its N-alkyl and N,N-dialkyl derivatives, N-[2,2-bis(hydroxymethyl)-3-hydroxypropyl]aminoethanesulfonic acid and its N-alkyl and N,N-dialkyl derivatives, N,N-bis(2-hydroxyethyl)aminoethanesulfonic acid and its N-alkyl derivatives (e.g. N-methyl-N,N-bis(2-hydroxyethyl)ammonioethanesulfonic acid betaine, N-ethyl-N,N-bis(2-hydroxyethyl)ammonioethanesulfonic acid betaine, N-butyl-N,N-bis(2-hydroxyethyl)ammonioethanesulfonic acid betaine, N-dodecyl-N,N-bis(2-hydroxyethyl)ammonioethanesulfonic acid betaine, N-stearyl-N,N-bis(2-hydroxyethyl)ammonioethanesulfonic acid betaine), N-(2-hydroxyethyl)-N-(2-hydroxypropyl)aminoethanesulfonic acid and its N-alkyl derivatives, N,N-bis(2-hydroxypropyl)aminoethanesulfonic acid and its N-alkyl derivatives, N,N-bis(4-hydroxybutyl)aminoethanesulfonic acid and its N-alkyl derivatives, N-(2-hydroxyethyl)-N-[1,1-bis(hydroxymethyl)-2-hydroxyethyl]aminoethanesulfonic acid and its N-alkyl derivatives, N-(3-hydroxypropyl)-N-[1,1-bis(hydroxymethyl)-2-hydroxyethyl]aminoethanesulfonic acid and its N-alkyl derivatives, N,N-bis(2,3-dihydroxypropyl)aminoethanesulfonic acid and its N-alkyl derivatives, N,N-bis[1-(hydroxymethyl)-2-hydroxyethyl]aminoethanesulfonic acid and its N-alkyl derivatives, N,N-bis[1,1-(bishydroxymethyl)-2-hydroxyethyl]aminoethanesulfonic acid and its N-alkyl derivatives, N,N,N-tris(2-hydroxyethyl)ammonioethanesulfonic acid betaine, N,N-bis(2-hydroxyethyl)-N-(3-hydroxypropyl)ammonioethanesulfonic acid betaine, N,N,N-tris(3-hydroxypropyl)ammonioethanesulfonic acid betaine, 3-[N-(2-hydroxyethyl)]aminopropanesulfonic acid-(1) and its N-alkyl and N,N-dialkyl derivatives (e.g. 3-[N-methyl-N-(2-hydroxyethyl)]aminopropanesulfonic acid-(1), 3-[N-ethyl-N-(2-hydroxyethyl)]aminopropanesulfonic acid-(1), 3-[N-isopropyl-N-(2-hydroxyethyl)]aminopropanesulfonic acid-(1), 3-[N-(2-ethylhexyl)-N-(2-hydroxyethyl)]aminopropanesulfonic acid-(1), 3-[N-decyl-N-(2-hydroxyethyl)]aminopropanesulfonic acid-(1), 3-[N-stearyl-N-(2-hydroxyethyl)]aminopropanesulfonic acid-(1), 3-[N,N-dimethyl-N-(2-hydroxyethyl)]ammoniopropanesulfonic acid-(1) betaine, 3-[N,N-diethyl-N-(2-hydroxyethyl)]ammoniopropanesulfonic acid-(1) betaine, 3-[N-methyl-N-dodecyl-N-(2-hydroxyethyl)]ammoniopropanesulfonic acid-(1) betaine), 3-[N-(2-hydroxy-1-methylethyl)]aminopropanesulfonic acid-(1) and its N-alkyl and N,N-dialkyl derivatives, 3-[N-(2-hydroxypropyl)]aminopropanesulfonic acid-(1) and its N-alkyl and N,N-dialkyl derivatives, 3-[N-(3-hydroxypropyl)]aminopropanesulfonic acid-(1) and its N-alkyl and N,N-dialkyl derivatives, 3-[N-(2-propyl-2-hydroxyethyl)]aminopropanesulfonic acid-(1) and its N-alkyl and N,N-dialkyl derivatives, 3-[N-(2-methyl-2-ethyl-2-hydroxyethyl)]aminopropanesulfonic acid-(1) and its N-alkyl and N,N-dialkyl derivatives, 3-[N-(1,2- dimethyl-2-hydroxyethyl)]aminopropanesulfonic acid-(1) and its N-alkyl and N,N-dialkyl derivatives, 3-[N-(1,1,2,2-tetramethyl-2-hydroxyethyl)]aminopropanesulfonic acid-(1) and its N-alkyl and N,N-dialkyl derivatives, 3-[N-(1-methyl-5,5-dimethyl-5-hydroxypentyl)-]aminopropanesulfonic acid-(1) and its N-alkyl and N,N-dialkyl derivatives, 3-[N-(1,2-diisopropyl-2-hydroxyethyl)]aminopropanesulfonic acid-(1) and its N-alkyl and N,N-dialkyl derivatives, 3-[N-(2,3-dihydroxypropyl)]aminopropanesulfonic acid-(1) and its N-alkyl and N,N-dialkyl derivatives, 3-[N-(1-hydroxymethyl-2-hydroxyethyl)]aminopropanesulfonic acid-(1) and its N-alkyl and N,N-dialkyl derivatives, 3-[N-(1-hydroxymethyl-2-methyl-2-hydroxyethyl)]aminopropanesulfonic acid-(1) and its N-alkyl and N,N-dialkyl derivatives, 3-[N-(1-hydroxymethyl-3-hydroxypropyl)-]aminopropanesulfonic acid-(1) and its N-alkyl and N,N-dialkyl derivatives, 3-{N-[1-(γ-hydroxypropyl)-2-hydroxyethyl]}aminopropanesulfonic acid-(1) and its N-alkyl and N,N-dialkyl derivatives, 3-{N-[1,1-bishydroxymethyl)-2-hydroxyethyl]}aminopropanesulfonic acid-(1) and its N-alkyl and N,N-dialkyl derivatives, 3-{N-[2,2-bis(hydroxymethyl)-3-hydroxypropyl]-}aminopropanesulfonic acid-(1) and its N-alkyl and N,N-dialkyl derivatives, 3-[N,N-bis(2-hydroxyethyl)-]aminopropanesulfonic acid-(1) and its N-alkyl derivatives (e.g. 3-[N-methyl-N,N-bis(2-hydroxyethyl)]ammoniopropanesulfonic acid-(1) betaine, 3-[N-ethyl-N,N-bis(2-hydroxyethyl)]ammoniopropanesulfonic acid-(1) betaine, 3-[N-butyl-N,N-bis(2-hydroxyethyl)]ammoniopropanesulfonic acid-(1) betaine, 3-[N-dodecyl-N,N-bis(2-hydroxyethyl)]ammoniopropanesulfonic acid-(1) betaine, 3-[N-stearyl-N,N-bis(2-hydroxyethyl)]ammoniopropanesulfonic acid-(1) betaine), 3-[N-(2-hydroxyethyl)-N-(2-hydroxypropyl)]aminopropanesulfonic acid-(1) and its N-alkyl derivatives, 3-[N,N-bis(2-hydroxypropyl)]aminopropanesulfonic acid-(1) and its N-alkyl derivatives, 3-[N,N-bis(4-hydroxybutyl)]aminopropanesulfonic acid-(1) and its N-alkyl derivatives, 3-[N-(2-hydroxyethyl)-N-(1,1-bis(hydroxymethyl)-2-hydroxyethyl)]aminopropanesulfonic acid-(1) and its N-alkyl derivatives, 3-[N-(3-hydroxypropyl)-N-(1,1-bis(hydroxymethyl)-2-hydroxyethyl)]aminopropanesulfonic acid-(1) and its N-alkyl derivatives 3-[N,N-bis(2,3-dihydroxypropyl)]aminopropanesulfonic acid-(1) and its N-alkyl derivatives, 3-[N,N-bis(1-(hydroxymethyl)-2-hydroxyethyl)]aminopropanesulfonic acid-(1) and its N-alkyl derivatives, 3-[N,N-bis(1,1-(bishydroxymethyl)-2-hydroxyethyl)]aminopropanesulfonic acid-(1) and its N-alkyl derivatives, 3-[N,N,N-tris(2-hydroxyethyl)]ammoniopropanesulfonic acid-(1) betaine, 3-[N,N-bis(2-hydroxyethyl)-N-(3-hydroxypropyl)]ammoniopropanesulfonic acid-(1) betaine, 3-[N,N,N-tris(3-hydroxypropyl)]ammoniopropanesulfonic acid-(1) betaine, 5-[N-(2-hydroxyethyl)]aminopentanesulfonic acid-(1) and its N-alkyl and N,N-dialkyl derivatives (e.g. 5-[N-methyl-N-(2-hydroxyethyl)]aminopentanesulfonic acid-(1), 5-[N-ethyl-N-(2-hydroxyethyl)]aminopentanesulfonic acid-(1), 5-[N-isopropyl-N-(2-hydroxyethyl)]aminopentanesulfonic acid-(1), 5-[N-(2-ethylhexyl)-N-(2-hydroxyethyl)]aminopentanesulfonic acid-(1), 5-[N-decyl-N-(2-hydroxyethyl)]aminopentanesulfonic acid-(1), 5-[N-stearyl-N-(2-hydroxyethyl)]aminopentanesulfonic acid-(1), 5-[N,N-dimethyl-N-(2-hydroxyethyl)]ammoniopentanesulfonic acid-(1) betaine, 5-[N,N-diethyl-N-(2-hydroxyethyl)]ammoniopentanesulfonic acid-(1) betaine, 5-[N-methyl-N-dodecyl-N-(2-hydroxyethyl)]ammoniopentanesulfonic acid-(1) betaine), 5-[N,N-bis(2-hydroxyethyl)]aminopentanesulfonic acid-(1) and its N-alkyl derivatives (e.g. 5-[N-methyl-N,N-bis(2-hydroxyethyl)]ammoniopentanesulfonic acid-(1) betaine, 5-[N-ethyl-N,N-bis(2-hydroxyethyl)]ammoniopentanesulfonic acid-(1) betaine, 5-[N-butyl-N,N-bis(2-hydroxyethyl)]ammoniopentanesulfonic acid-(1) betaine, 5-[N-dodecyl-N,N-bis(2-hydroxyethyl)]ammoniopentanesulfonic acid-(1) betaine, 5-[N-stearyl-N,N-bis(2-hydroxyethyl)]ammoniopentanesulfonic acid-(1) betaine), 5-[N,N,N-tris(2-hydroxyethyl)]ammoniopentanesulfonic acid-(1) betaine, N-(2-hydroxyethyl)iminodiethanesulfonic acid, N-(2-hydroxypropyl)iminodiethanesulfonic acid, N-(2,3-dihydroxypropyl)iminodiethanesulfonic acid, N-[1,1-bis(hydroxymethyl)-2-hydroxyethyl]iminodiethanesulfonic acid, N-(2-hydroxyethyl)iminoethanesulfonic acid propanesulfonic acid, N-(2-hydroxypropyl)iminoethanesulfonic acid propanesulfonic acid, N-(2,3-dihydroxypropyl)iminoethanesulfonic acid propanesulfonic acid, N-[1,1-bis(hydroxymethyl)-2-hydroxyethyl]iminoethanesulfonic acid propanesulfonic acid, N-(2-hydroxyethyl)orthanilic acid, N-(2-hydroxyethyl)metanilic acid, N-(2-hydroxyethyl)sulfanilic acid, N,N-bis(2-hydroxyethyl)-orthanilic acid, N,N-bis(2-hydroxyethyl)metanilic, N,N-bis(2-hydroxyethyl)sulfanilic acid, etc. They may be used as such or in the salt forms with basic substances such as ammonia, amines and alkali metals.

As the polycarboxylic acid(s), there may be exemplified adipic acid, azelaic acid, sebacic acid, decanedicarboxylic acid, dodecyldicarboxylic acid, isophthalic acid, terephthalic acid, etc. Their reactive derivatives such as phthalic anhydride, succinic anhydride, tetrahydrophthalic anhydride, hymic anhydride, trimellitic anhydride, pyromellitic anhydride, tetrabromophthalic anhydride, tetrachlorophthalic anhydride and hettic anhydride are also usable.

As the polyol(s), there may be exemplified ethylene glycol, propylene glycol, 1,3-butylene glycol, 1,6-hexanediol, diethylene gycol, dipropylene glycol, neopentyl glycol, triethylene glycol, hydrogenated bisphenol, glycerol, trimethylolethane, trimethylolpropane, pentaerythritol, etc.

Examples of the oxirane compound(s) are phenylglycidyl ether, methyl glycidyl ether, n-butyl glycidyl ether, glycidyl versatate, α-olefin oxide, etc.

Examples of the said fatty acid(s) are soybean oil fatty acid, linseed oil fatty acid, safflower oil fatty acid, tall oil fatty acid, coconut oil fatty acid, dehydrated castor oil fatty acid, tung oil fatty acid, synthetic fatty acid, etc. In place of or in combination with these fatty acids, there may be employed oils such as castor oil, coconut oil, linseed oil, palm oil, safflower oil, soybean oil, tung oil and dehydrated castor oil.

The reaction conditions and operations in the production of the polyester from the said monomeric components may be conventional and ordinary. For instance, those as described in D. H. Solomone: "The Chemistry of Organic Film Formers" (John Wiley & Sons), pages 75 to 87 (1967) may be adopted. Further, for instance, the descriptions on Japanese Patent Applications Nos. 110865/1979 and 56048/1980 may be referred to.

The polyester thus produced is useful as the emulsifier of the invention, and the one having an acid value of 30 to 150 (particularly 40 to 150) and a number average molecular weight ($\overline{Mn}$) of 500 to 5000 (especially 700 to 3000) is preferable. By controlling appropriately the balance between the molecular weight and the hydrophilic functional group, various properties such as foaming, emulsification and dispersibility can be enhanced. Further, the polyester resin is preferred when its acid groups are neutralized with a basic substance (e.g. ammonia, an amine (preferably a tertiary amine) or an alkali metal in an amount corresponding to an acid value of not less than 30, because the solubility into water is enhanced in such neutralization state.

Hitherto, there have been known high molecular emulsifiers comprising as the essential component an unsaturated polyester obtained, for instance, by esterification of a long chain unsaturated dibasic acid with a divalent alcohol [Japanese Patent Publication (unexamined) No. 126290/1979]. However, these known emulsifiers do not have a catalyst function as possessed by an amphoionic group.

The acrylic resin emulsion of the invention comprises an aqueous medium such as water or its mixture with any water-miscible organic solvent and particles of an acrylic resin emulsified and dispersed therein by the use of the polyester. The said emulsion can be prepared, for instance, by subjecting an $\alpha,\beta$-unsaturated monomer(s) to emulsion polymerization in an aqueous medium in the presence of a polymerization initiator and in the coexistence of the polyester.

As the $\alpha,\beta$-unsaturated monomer(s), there may be used conventional polymerizable vinyl monomers. Typical examples are acrylic acid and methacrylic acid, and their esters, which are representable by the formula:

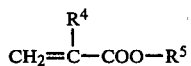

wherein $R^4$ is a hydrogen atom or a methyl group and $R^5$ is a hydrogen atom or a straight or branched $C_1$-$C_{12}$ alkylene group optionally bearing one or more hydroxyl groups on the alkylene chain. Other typical examples are acrylamide, methacrylamide, acrylonitrile, methacrylonitrile, etc. Other $\alpha,\beta$-unsaturated acids (e.g. crotonic acid, itaconic acid, maleic acid, fumaric acid) and their esters, styrene and $\alpha$-methylstyrene and their $C_1$-$C_4$ alkyl-substituted derivatives, vinyl acetate, vinyl chloride, butadiene, isoprene, etc. are also usable.

As the polymerization initiator, there may be used any conventional polymerization initiator, of which examples are inorganic initiators (e.g. potassium persulfate, sodium persulfate, ammonium persulfate, hydrogen peroxide), Redox system initiators consisting of said inorganic initiators with sodium pyrosulfite, sodium hydrogen sulfite, ferric ion, etc., water-soluble azo compounds (e.g. azobiscyanovaleric acid, azobis(2-amidinopropane) hydrochloride), etc. These polymerization initiators may be employed usually in an amount of 0.05 to 5 parts by weight, preferably of 0.1 to 4 parts by weight, to 100 parts by weight of the said $\alpha,\beta$-unsaturated monomer(s).

When desired, there may be employed any conventional chain transfer agent such as an organic peroxide (e.g. benzoyl peroxide, t-butyl peroxide, cumene hydroperoxide) or an azo compound (e.g. azobisisobutyronitrile, azobis-2,4-dimethylvaleronitrile) in addition to the polymerization initiator. On the use of the polymerization initiator, it may be employed in the form of solution into water, a water-miscible organic solvent or an $\alpha,\beta$-unsaturated monomer.

The emulsion polymerization may be accomplished by a per se conventional procedure except that the polyester is used as an emulsifier. For instance, the polymerization may be carried out at a temperature of 0° to 100° C. for a period of 5 minutes to 72 hours batchwise or continuously. The amount of the polyester as the emulsifier may be usually from 0.5 to 200 parts by weight, preferably from 1.0 to 100 parts by weight, to 100 parts by weight of the $\alpha,\beta$-unsaturated monomer(s). When the amount is less than 0.5 part by weight, a large amount of coagulated lumps are produced during the polymerization. When the amount is more than 200 parts by weight, it will lose the characteristics of the acrylic resin emulsion. The non-volatile components in the produced emulsion are preferred to be in an amount of not more than 60% by weight, particularly from 20 to 55% by weight, on the basis of the weight of the emulsion.

In place of the emulsion polymerization, the $\alpha,\beta$-unsaturated monomer(s) may be subjected to any other polymerization such as solution polymerization or bulk polymerization to give an acrylic resin, followed by emulsifying and dispersing the thus prepared acrylic resin into an aqueous medium in the presence of the polyester to obtain the objective acrylic resin emulsion.

The thus obtained acrylic resin emulsion is quite stable, and the coagulation and/or precipitation of the acrylic resin particles can hardly take place. In case of conventional low molecular emulsifiers, their use in reletively large amounts (e.g. 4 to 8% by weight to the weight of the monomer(s)) is necessary, and therefore the emulsifiers remain in relatively large amounts in the coating films formed by the use of the emulsions containing them, whereby the physical properties of the coating films are frequently deteriorated. In the present invention, the amount of the emulsifier may be so small as 0.5% by weight, and any influence is scarcely produced. Further, the number average molecular weight of the emulsifier (i.e. the polyester) is so great as 500 to 5000, and therefore even if it is retained in a relatively large amount in the coating film, the deterioration of the physical properties is hardly produced.

The acrylic resin emulsion of the invention is excellent in stability (e.g. storage stability, mechanical stability, mixing stability) and can be easily blended with any other water-soluble polymer.

The coating composition of the invention comprises as the essential and major component the said acrylic emulsion. In other words, the coating composition may comprise the acrylic emulsion alone or, in addition thereto, any conventional resinous vehicle such as an aminoplast resin (e.g. melamine resin, urea resin, guanamine resin), a phenoplast resin or an epoxy resin, an organic or inorganic pigment such as a color pigment or a rust-proof pigment, an additive such as a filler, a diluent or a thickening agent, a surfactant, a pH regulator, a solvent (e.g. water, a water-miscible organic solvent) or the like. These materials may be mixed together at room temperature.

When the coating composition is applied onto a suitable substrate such as a metal plate, a wooden plate, a paper sheet or a building material to make a film of 5 to 500μ in thickness and dried at a temperature of 10° to 240° C. for a period of 20 seconds to 72 hours, there is formed a cured coating film having good physical properties.

In the coating composition of the invention, the use of the acrylic resin emulsion with an acid catalyst thermosetting resin such as a methylol crosslinking resin (e.g. an aminoplast resin) makes it possible to accomplish curing at low tempertures, because the crosslinking reaction is accelerated by the catalytic action of the amphoionic group in the polyester as the emulsifier. The formed film is excellent in water resistance, solvent resistance, hardness, gloss, etc.

The polyester as the emulsifier has hydroxyl groups and carboxyl groups which can be reacted with active methylol groups. Therefore, as the result of the cross-linking reaction, it can be incorporated into the three dimentional structure so as to enhance the physical properties of the film. Further, the excellent properties inherent to polyester resins can be imparted to the film. Namely, such film has high hardness and good elasticity. In addition, various other favorable properties such as weather resistance, oil resistance, chemical resistance and high gloss are provided to the film.

Practical and presently preferred embodiments of this invention are shown in the following Examples wherein % and part(s) are by weight.

Reference Example 1

Into a 2 liter volume flask equipped with a stirrer, a nitrogen gas inlet, a temperature regulator and a condenser, hydroxyethyltaurine (191 parts), ethylene glycol (140 parts), triethylene glycol (170 parts), adipic acid (331 parts), phthalic anhydride (168 parts) and xylene (40 parts) were charged, and the temperature was elevated to about 190° C. in about 2 hours, during which by-produced water was eliminated as an azeotropic mixture with xylene to make an acid value attributed to carboxyl groups below 10. The thus obtained polyester showed an acid value of 79, a hydroxyl value of 79 and a number average molecular weight of 708.

Reference Example 2

Into a 2 liter volume flask equipped with a stirrer, a nitrogen gas inlet, a temperature regulator and a condenser, bishydroxyethyltaurine (134 parts), neopentyl glycol (130 parts), azelaic acid (236 parts), phthalic anhydride (186 parts) and xylene (27 parts) were charged, and the temperature was elevated to about 190° C. in about 2 hours, during which by-produced water was eliminated as an azeotropic mixture with xylene to make an acid value attributed to carboxyl groups around 145. The reaction mixture was cooled to 140° C., and "Cardula E10" (glycidyl varsatate manufactured by Shell Kagaku K.K.) (314 parts) was dropwise added thereto in 30 mimutes. Then, stirring was continued for 2 hours, whereby the reaction was completed. The thus obtained polyester showed an acid value of 59, a hydroxyl value of 90 and a number average molecular weight of 1054.

Reference Example 3

In the same manner as in Reference Example 1 but using β-hydroxyethylaminodiethanesulfonic acid (340 parts), neopentyl glycol (94 parts), azelaic acid (340 parts) and "Cardula E10" (226 parts), the reaction was carried out to give a polyester having an acid value of 62, a hydroxyl value of 62 and a number average molecular weight of 908.

Reference Example 4

Into a 2 liter volume flask equipped with a stirrer, a nitrogen gas inlet, a temperature regulator and a condenser, dehydrated castor oil (85 parts), coconut oil (63 parts) and trimethylolpropane (53 parts) were charged, the atmosphere in the flask was replaced by nitrogen, and the temperature was elevated up to 240° C. Stirring was continued for 30 minutes. Then, the temperature was lowered to 150° C., and stirring was stopped. Phthalic anhydride (725 parts), diethylene glycol (343 parts), trimethylolpropane (43 parts), N,N-bis(2-hydroxyethyl)aminoethanesulfonic acid (375 parts) and xylene (45 parts) were charged therein, and stirring was again continued. The temperature was gradually elevated up to 240° C. in about 2 hours, during which by-produced water was eliminated as an azeotropic mixture with xylene to make an acid value attributed to the carboxyl groups around 8. The thus obtained polyester showed an oil length of 10, an acid value of 66, a hydroxyl value of 100 and an number average molecular weight of 800.

EXAMPLE 1

Into a reactor equipped with a stirrer and a temperature regulator, paraffin wax of M.P. 70°–90° C. (100 parts) and the polyester obtained in Reference Example 1 (10 parts) were charged, and the temperature was elevated to 120° C. The resultant solution was added to a solution of dimethylethanolamine (1 part) in deionized water (300 parts) kept at 90° C. while vigorous stirring, whereby the resulting mixture became turbid at once. The mixture was cooled to give a white emulsion having a good stability.

EXAMPLE 2

Into a reactor equipped with a stirrer and a temperature regulator, butyl cellosolve (144.2 parts) was charged, and the temperature was elevated to 120° C. Acrylic acid (10.5 parts), 2-hydroxyethyl acrylate (68.1 parts), methyl methacrylate (396 parts), n-butyl acrylate (225.8 parts), styrene (123.6 parts) and azobisisobutyronitrile (5 parts) were added thereto while stirring, and stirring was continued for 2 hours. The thus obtained acrylic resin showed a number average molecular weight of 6300 and an acid value of 11.7

To the resin solution kept at 100° C., the polyester obtained in Reference Example 2 (400 parts) was added to make a uniform solution. The uniform solution was added to a solution of dimethylethanolamine (40 parts) in deionized water (1675 parts) kept at 70° C. while vigorous stirring, whereby the mixture became turbid at once. The mixture was cooled to give a white emulsion having a good stability and a viscosity of 32000 cps (25° C.).

EXAMPLE 3

Into a reactor equipped with a stirrer and a temperature regulator, a short oil alkyd resin-tall oil fatty acid modified alkyd resin ("R-1730 resin" manufactured by Nippon Paint Co., Ltd.; oil length, 40%; acid value, 3.8; hydroxyl value, 124; number average molecular weight, 1420) (200 parts), xylene (22 parts) and the polyester obtained in Reference Example 2 (40 parts) were charged, and the temperature was elevated to 80° C. while stirring. After addition of dimethylethanolamine (5 parts), deionized water (450 parts) was dropwise added thereto in 60 minutes, whereby turbidity was produced. The mixture was cooled to give a white emulsion having a good stability and a viscosity of 21000 cps (25° C.).

EXAMPLE 4

Into a reactor equipped with a stirrer and a temperature regulator, an oil free alkyd resin ("R-4304 resin" manufactured by Nippon Paint Co., Ltd.; acid value, 8.9; hydroxyl value, 85; number average molecular weight, 1960) (200 parts), xylene (22 parts) and the polyester obtained in Reference Example 3 (10 parts) were charged, and the temperature was elevated to 80° C. while stirring. A solution of dimethylethanolamine (3 parts) in deionized water (450 parts) was dropwise added thereto, whereby turbidity was produced. The mixture was cooled to give a white emulsion having good stability and a viscosity of 15000 cps (25° C.).

EXAMPLE 5

In the same manner as in Example 3 but using the polyester obtained in Reference Example 4 (50 parts) and 28% ammonia water (4.3 parts) in place of the polyester obtained in Reference Example 2 (40 parts) and dimethylethanolamine (5 parts), the operation was carried out to give a white emulsion having a viscosity of 19500 cps (25° C.).

EXAMPLE 6

Into a reactor equipped with a stirrer, a cooler and a temperature regulator, deionized water (306 parts), the polyester obtained in Reference Example 1 (30 parts) and dimethylethanolamine (3 parts) (first mixture) were charged, and stirring was carried out at 80° C. A solution of azobiscyanovaleric acid (4.5 parts) in deionized water (45 parts) and diethanolamine (4.3 parts) was added thereto. Then, methyl methacrylate (72 parts), n-butyl acrylate (96 parts), styrene (72 parts) and 2-hydroxyethyl acrylate (30 parts) (second mixture) were dropwise added thereto in 60 minutes. After the dropwise addition was completed, a solution of azobiscyanovaleric acid (1.5 parts) in deionized water (15 parts) and diethanolamine (1.4 parts) was dropwise added thereto, and the resultant mixture was stirred at 80° C. in 60 minutes to give an acrylic resin emulsion having a nonvolatile content of 45%, a pH of 7, a viscosity of 63 cps (25° C.) and an average particle size of 0.124μ. When the emulsion was filtered through a 400 mesh net, the coagulum which was retained on the net was less than 0.3% on the basis of the weight of the produced emulsion.

EXAMPLES 7–13

In the same manner as in Example 6 but using the polyester obtained in Reference Example 2 or 3 as the emulsifier and the components as shown in Table 1, the operation was carried out to make an emulsion, of which the properties are shown in Table 1.

Comparative Example 1

For comparison, a polyester not containing any amino-sulfonic acid type amphoionic group was synthesized, and an emulsion was prepared by the use of the polyester as the emulsifier. Namely, neopentyl glycol (248 parts), azelaic acid (224 parts), phthalic anhydride (176 parts), trimellitic anhydride (114 parts) and xylene (40 parts) were charged in the same reactor as in Reference Example 1, and the temperature was elevated to 190° C. in 2 hours, during which by-produced water was eliminated as an azeotropic mixture with xylene to make the acid value around 150. The mixture was cooled to 140° C., "Cardula E10" (238 parts) was dropwise added thereto in 30 minutes and stirring was continued for 2 hours, whereby the reaction was completed. The thus obtained polyester showed an acid value of 48, a hydroxyl value of 140 and a number average molecular weight of 1101.

In the same manner as in Example 6 but using the polyester obtained above and the components as shown in Table 1, the operation was carried out to make an emulsion, of which the properties are shown in Table 1.

TABLE 1

| | | Composition (part(s)) | | | | | | | | | | | |
|---|---|---|---|---|---|---|---|---|---|---|---|---|---|
| | | First mixture | | Initiator solution | | | Second mixture | | | | Additional initiator solution | | |
| | Polyester | Deionized water | DMEA | ACVA | DMEA | Deionized water | MMA | n-BA | ST | 2-HEA | ACVA | DMEA | Deionized water |
| Example | | | | | | | | | | | | | |
| 2 | Reference Example 2 (30) | 306 | 3.0 | 4.5 | 4.3 | 45 | 72 | 96 | 72 | 30 | 1.5 | 1.4 | 15 |
| 3 | Reference Example 2 (2.7) | 306 | 1.0 | 4.5 | 4.3 | 45 | 72 | 96 | 72 | 30 | 1.5 | 1.4 | 15 |
| 4 | Reference Example 2 (60) | 306 | 6.0 | 4.5 | 4.3 | 45 | 72 | 96 | 72 | 30 | 1.5 | 1.4 | 15 |
| 5 | Reference Example 3 (10) | 306 | 3.0 | 4.5 | 4.3 | 45 | 72 | 96 | 72 | 30 | 1.5 | 1.4 | 15 |
| 6 | Reference Example 2 (60) | 422 | 6.0 | 1.5 | 1.4 | 15 | 24 | 32 | 24 | 10 | 0.5 | 0.5 | 5 |
| 7 | Reference Example 2 (60) | 585 | 6.0 | 0.8 | 0.8 | 8 | 40 | — | 20 | — | — | — | — |
| 8 | Reference Example 2 (150) | 400 | 15.0 | 2.5 | 2.4 | 25 | 40 | 54 | 40 | 16 | 0.8 | 0.8 | 8 |
| Comparative Example 1 | 30 | 306 | 3.0 | 4.5 | 4.3 | 45 | 72 | 96 | 72 | 30 | 1.5 | 1.4 | 15 |

| Properties | | | |
|---|---|---|---|
| Nonvolatile | Viscosity | Average particle | Coagulum retained |

TABLE 1-continued

|  | content (%) | pH | ity (cps) | ticle size A | B | on 400 mesh net |
|---|---|---|---|---|---|---|
| Example 2 | 45 | 7 | 56 | 0.135 | 0.110 | 0.2 |
| 3 | 41 | 7 | 34 | 0.204 | — | 1.0 |
| 4 | 50 | 7 | 136 | 0.112 | 0.080 | 0.1 |
| 5 | 42 | 7 | 72 | 0.126 | — | 0.3 |
| 6 | 25 | 7 | 61 | 0.230 | 0.042 | None |
| 7 | 20 | 7 | 23 | 0.216 | 0.035 | None |
| 8 | 40 | 7 | 1070 | 0.268 | 0.041 | None |
| Comparative Example 1 | 41 | 7 | 28 | 0.221 | — | 9.1 |

Note:
DMEA, dimethylethanolamine;
ACVA, azobiscyanovaleric acid;
MMA, methyl methacrylate;
n-BA, n-butyl acrylate;
ST, styrene;
2-HEA, 2-hydroxyethyl acrylate.
Particle size A: measured by light-scattering photometer.
Particle size B: measured by electron microscope.

EXAMPLE 14

Into a reactor equipped with a stirrer, a cooler and a temperature regulator, deionized water (408 parts) and dimethylethanolamine (4 parts) were charged, and stirring was carried out at 80° C. A solution of azobiscyanovaleric acid (6.4 parts) in deionized water (64 parts) and dimethylethanolamine (6.1 parts) was added thereto. Then, a mixture of methyl methacrylate (96 parts), n-butyl acrylate (128 parts), styrene (96 parts), 2-hydroxyethyl acrylate (40 parts) and the polyester obtained in Reference Example 2 (40 parts) was dropwise added thereto in 60 minutes. After the dropwise addition was completed, a solution of azobiscyanovaleric acid (1.6 parts) in deionized water (16 parts) and dimethylethanolamine (1.5 parts) was dropwise added thereto, and the resultant mixture was stirred at 80° C. in 60 minutes to give an acrylic resin emulsion having a non-volatile content of 45%, a pH of 7, a viscosity of 82 cps (25° C.) and an average particle size of 0.183μ. When the emulsion was filtered through a 400 mesh net, the coagulum which was retained on the net was 2.5% on the basis of the weight of the produced emulsion.

EXAMPLE 15

Into a reactor equipped with a stirrer, a cooler and a temperature regulator, deionized water (306 parts), the polyester obtained in Reference Example 2 (30 parts) and dimethylethanolamine (3 parts) were charged, and stirring was carried out at 80° C. A solution of azobiscyanovaleric acid (4.5 parts) in deionized water (45 parts) and diethanolamine (4.3 parts) was added thereto. Then, a mixture of methyl methacrylate (72 parts), n-butyl acrylate (96 parts), styrene (72 parts) and 2-hydroxyethyl acrylate (30 parts) were dropwise added thereto in 60 minutes. After the dropwise addition was completed, a solution of azobiscyanovaleric acid (1.5 parts) in deionized water (15 parts) and diethanolamine (1.4 parts) was dropwise added thereto, and the resultant mixture was stirred at 80° C. in 60 minutes to give an acrylic resin emulsion having a non-volatile content of 45%, a pH of 7, a viscosity of 56 cps (25° C.) and an average particle size of 0.135μ. When the emulsion was filtered through a 400 mesh net, the coagulum which was retained on the net was less than 0.2% on the basis of the weight of the produced emulsion.

EXAMPLE 16

To the emulsion obtained in Example 15 (100 parts), an aminoplast resin solution prepared by dissolving hexamethoxymethylolmelamine ("Cymel 303" manufactured by American Cyanamid) (11 parts) in a mixture of ethylene glycol monobutyl ether (5.5 parts) and deionized water (5.5 parts) was gradually added while stirring with a labomixer to give a thermosetting coating composition.

The composition was applied onto a steel plate to make a coating film of about 20μ in thickness (after drying) and then subjected to heat setting at a temperature of 100° C., 120° C., 140° C. or 160° C. for 30 minutes. The thus formed film was transparent.

The thus formed film was extracted with acetone by the aid of a Soxhlet's extractor for 4 hours. The results are shown in Table 2. Table 2 also shows the properties of the film heat set at 140° C.

Comparative Example 2

Resin emulsion

Into the same reactor as in Reference Example 1, neopentyl glycol (248 parts), azelaic acid (224 parts), phthalic anhydride (176 parts), trimellitic anhydride (114 parts) and xylene (40 parts) were charged, and the temperature was elevated to 190° C. in 2 hours, during which by-produced water was eliminated as an azeotropic mixture with xylene to make an acid value around 150. The reaction mixture was cooled to 140° C., and "Cardula E10" (238 parts) was dropwise added thereto in 30 minutes, followed by continuous stirring for 2 hours. The thus obtained polyester resin showed an acid value of 48, a hydroxyl value of 140 and a number average molecular weight of 1191.

In the same manner as in Example 15 but using a polyester not containing any amino-sulfonic acid type amphoionic group (30 parts) in place of the polyester prepared in Reference Example 2, the operation was carried out. The thus obtained emulsion showed a non-volatile content of 41%, a pH of 7, a viscosity of 28 cps (25° C.) and an average particle size of 0.221μ. When the emulsion was filtered through a 400 mesh net, the coagulum which was retained on the net was 9.1% on the basis of the weight of the produced emulsion.

Coating composition

In the same manner as in Example 16 but using the emulsion as above, the operation was carried out to give a thermosetting coating composition. The results are shown in Table 2.

TABLE 2

| Item | | Heat set temperature (°C.) | Example 16 | Comparative Example 2 |
| --- | --- | --- | --- | --- |
| Degree of cross-linking | Acetone insolubles (%) | 100 | 65 | 68 |
| | | 120 | 90 | 78 |
| | | 140 | 96 | 88 |
| | | 160 | 98 | 94 |
| water resistance | Boiling water insolubles (%) | 140 | 98 | 92 |
| | Whitening | 140 | O | X |
| Gloss | | 140 | 96 | 63 |
| Pencil hardness | | 140 | 2H | HB |

What is claimed is:

1. An acrylic resin emulsion which comprises an aqueous medium and particles of an acrylic resin emulsified and dispersed therein by the use of the emulsifier comprising as an essential component a polyester comprising in the molecule an amino-sulfonic acid type amphoionic group of the formula:

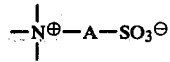

wherein A is a straight or branched $C_1$–$C_6$ alkylene group, a phenylene group or a substituted phenylene group.

2. The acrylic resin emulsion according to claim 1, wherein non-volatile components are included in an amount of not more than 60% by weight based on the weight of the emulsion.

3. The acrylic resin emulsion according to claim 1, wherein the amount of the polyester in the emulsifier is 0.5 to 200 parts by weight to 100 parts by weight of the acrylic resin.

4. The acrylic resin emulsion according to claim 1, which is prepared by emulsion polymerization of at least one polymerizable $\alpha,\beta$-unsaturated monomer in an aqueous medium in the presence of the emulsifier as defined in claim 1.

5. The acrylic resin emulsion according to claim 4, wherein the polyester is neutralized.

6. A coating composition which comprises as an essential component the acrylic resin emulsion according to claim 1.

7. The coating composition according to claim 6, which further comprises a melamine resin.

* * * * *